G. F. MUTH.
AIR VALVE.
APPLICATION FILED JAN. 8, 1919.
1,348,123.
Patented July 27, 1920.
2 SHEETS—SHEET 1.
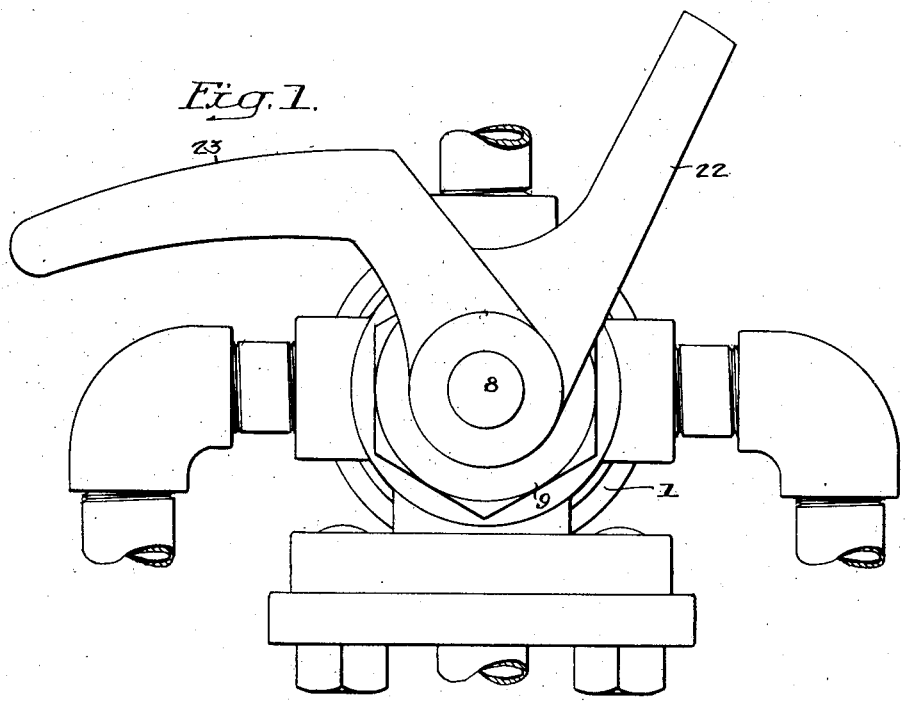
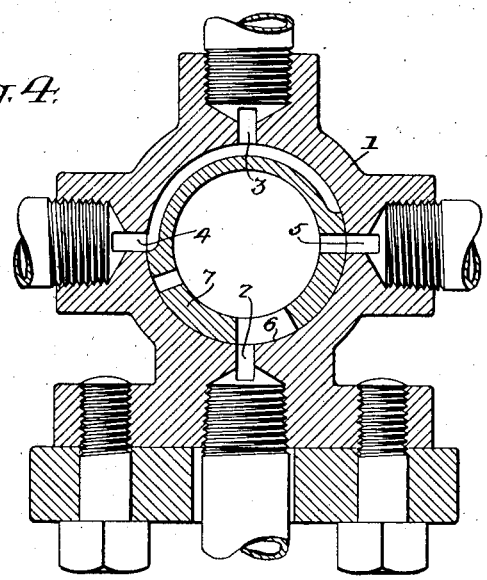
Inventor,
George F. Muth,
by his Attorneys,

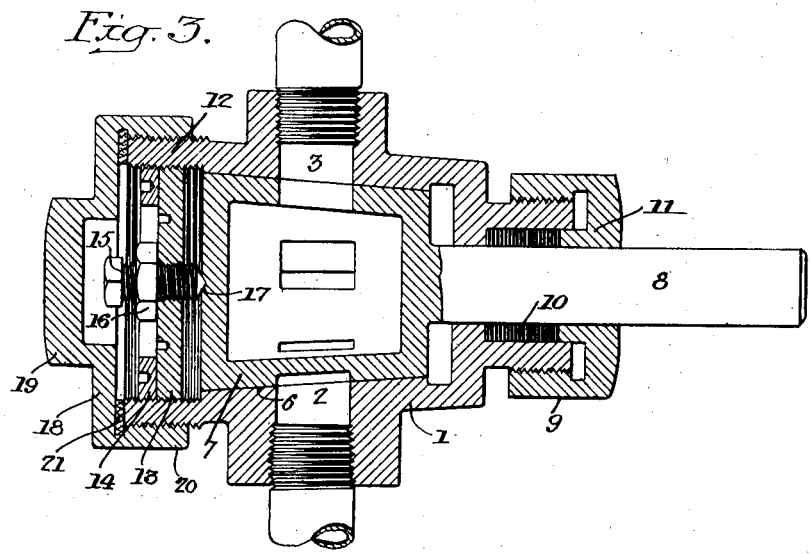
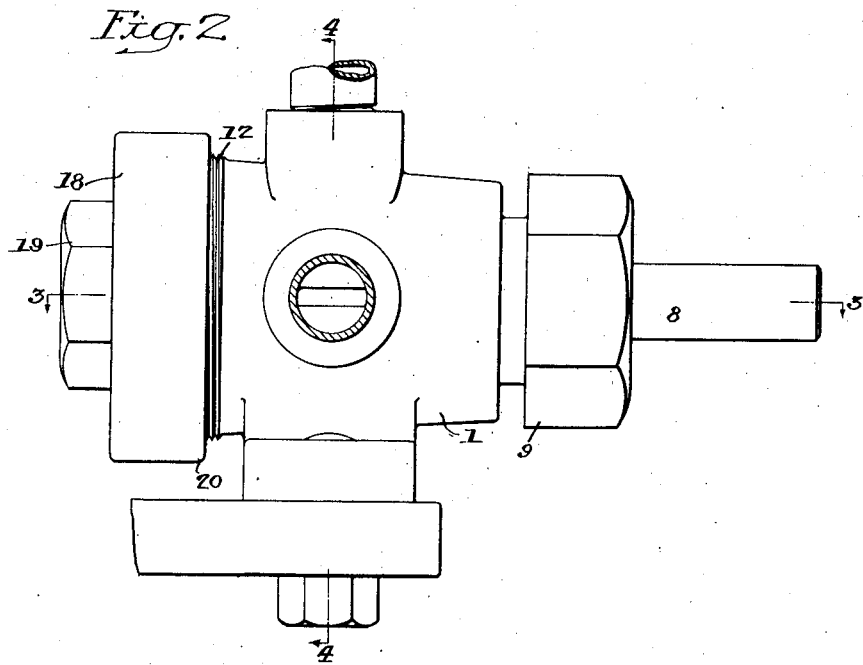

UNITED STATES PATENT OFFICE.

GEORGE F. MUTH, OF PHILADELPHIA, PENNSYLVANIA, ASSIGNOR TO NEWTON MACHINE TOOL WORKS, INCORPORATED, OF PHILADELPHIA, PENNSYLVANIA, A CORPORATION OF PENNSYLVANIA.

AIR-VALVE.

1,348,123.  Specification of Letters Patent.  Patented July 27, 1920.

Application filed January 8, 1919. Serial No. 270,189.

*To all whom it may concern:*

Be it known that I, GEORGE F. MUTH, a citizen of the United States, residing in Philadelphia, Pennsylvania, have invented certain Improvements in Air-Valves, of which the following is a specification.

My invention relates particularly to air valves for controlling the air in machines having reciprocating parts which actuate the valve, but it will be understood that the invention can be used in valves for other purposes.

One object of the invention is to construct the air valve so that leakage of air is reduced to a minimum.

A further object of the invention is to design the valve so that the means for taking up the wear on the valve is accessible at all times.

In the accompanying drawings:

Figure 1 is a front view of my improved air valve;

Fig. 2 is a side view of the same;

Fig. 3 is a longitudinal sectional view on the line 3—3, Fig. 2, and

Fig. 4 is a transverse sectional view on the line 4—4, Fig. 2.

Referring to the drawings, 1 is the valve casing having four ports 2, 3, 4 and 5, in the present instance. The port 2 is connected to a supply pipe, the port 3 is connected to an exhaust pipe, while the ports 4 and 5 lead to cylinders which are under the control of the valve. The seat 6 in the valve is made conical and mounted in the valve casing is a conical valve 7, which snugly fits the seat under normal conditions. This valve has a stem 8 which projects through a stuffing box 9 in one end of the valve casing. This stuffing box has, in the present instance, a packing 10 and a follower 11 having a threaded portion adapted to the thread on the casing. At the opposite end of the valve casing is an extension 12 having an external and an internal screw thread. Adapted to the internal screw thread is a partition 13 and back of this partition is an annular ring 14, which forms a jam nut for holding the partition in the position to which it is adjusted. Each of these elements has two or more recesses for a spanner ring, or other tool, by which it can be turned. Mounted in the partition 13 is a set screw 15 and on this set screw is a jam nut 16. The set screw has a head at one end and has a point at the opposite end adapted to a recess 17 in the end of the valve 7 so that by adjusting this set screw more or less pressure can be applied to the valve so that it will be properly seated in the casing.

In order to prevent the escape of air from the end of the valve casing, I provide a cap 18 having a projection 19 shaped to receive any suitable tool by which it can be turned. This cap has a threaded flange 20 adapted to the external thread on the extension 12 of the casing 1. Mounted between the cap and the end of the extension is a gasket 21 of any suitable material, which will form a packing, so that when the cap is screwed into position an air tight joint will be formed between the casing and the cap. When it is desired to adjust the valve for any purpose the cap can be readily removed so as to gain access to the set screw 15 and the partition 14. The valve 7 has suitable ports and passages arranged to communicate with the ports in the casing. These ports and passages may be made in any manner desired. In the present instance, the ports and passages are so arranged that when one cylinder port is communicating with the supply port, the other cylinder port is connected to the exhaust. While I have shown four ports, in the present instance, a larger or smaller number may be provided, according to the use for which the valve is intended.

Attached to the valve stem are operating arms 22 and 23, which are so proportioned as to be struck by a moving part of the machine to which it is applied, so that the valve will be automatically operated. The shape of these arms will depend upon the type of machine to which the valve is applied.

By the above construction, it will be seen that the valve can be held firmly to its seat with the least amount of friction, owing to the small bearing of the set screw upon the end of the valve, and that leakage is prevented at one end of the valve casing by the ordinary stuffing box and at the opposite end by the adjustable partition and the cap and gasket.

While my invention is especially adapted for use with an air valve, it will be understood that it can also be used as a steam valve, or a hydraulic valve, if so desired.

I claim:

1. The combination in a valve, of a casing having ports and having a tapered valve seat, said valve casing having a stuffing box at one end and an extension at the opposite end; a tapered valve adapted to the tapered seat in the casing and having an operating stem extending through the stuffing box, the extension of the casing having an external and an internal thread; a partition having a thread on its periphery adapted to the internal thread; a set screw extending through the partition and bearing against the valve; a cap having a thread adapted to the external thread of the extension; and a gasket between the cap and the end of the extension.

2. The combination in an air valve, of a casing having ports and having a tapered valve seat and having at one end a stuffing box and at the other end an extension; a tapered valve adapted to the seat in the casing and having an operating spindle at its small end extending through the stuffing box, the extension of the casing having external and internal threads; a partition having a thread on its periphery adapted to the internal threads; a ring, also having a thread on its periphery, located back of the partition; a set screw extending through the partition and having a pointed end adapted to a recess in the center of the rear portion of the valve; a jam nut on the set screw; a cap having a thread adapted to the external thread of the extension; and a gasket between the end of the extension and the cap.

In witness whereof I affix my signature.

GEORGE F. MUTH.